(12) United States Patent
Chatzakis et al.

(10) Patent No.: US 10,808,606 B2
(45) Date of Patent: Oct. 20, 2020

(54) TURBOCHARGER HOUSING

(71) Applicant: Perkins Engines Company Limited, Peterborough (GB)

(72) Inventors: Menelaos Chatzakis, Peterborough (GB); Prabhu Ramasamy, Peterborough (GB); Adam Dudley, Stamford (GB)

(73) Assignee: Perkins Engines Company Limited, Peterborough (GB)

(*) Notice: Subject to any disclaimer, the term of this patent is extended or adjusted under 35 U.S.C. 154(b) by 237 days.

(21) Appl. No.: 15/970,515

(22) Filed: May 3, 2018

(65) Prior Publication Data
US 2018/0328270 A1 Nov. 15, 2018

(30) Foreign Application Priority Data
May 15, 2017 (EP) .................................... 17171067

(51) Int. Cl.
| F02B 37/18 | (2006.01) |
| F04D 29/42 | (2006.01) |
| F02C 7/057 | (2006.01) |
| F04D 29/46 | (2006.01) |
| F02B 39/14 | (2006.01) |
| F02C 6/12 | (2006.01) |
| F04D 25/02 | (2006.01) |

(52) U.S. Cl.
CPC .......... *F02B 37/186* (2013.01); *F02B 37/183* (2013.01); *F02B 39/14* (2013.01); *F02C 6/12* (2013.01); *F02C 7/057* (2013.01); *F04D 25/024* (2013.01); *F04D 29/4213* (2013.01); *F04D 29/464* (2013.01); *F05D 2220/40* (2013.01)

(58) Field of Classification Search
CPC .... F02B 37/183; F02B 37/186; F02B 39/005; F01D 25/24; F02C 6/12; F01M 1/02
See application file for complete search history.

(56) References Cited

U.S. PATENT DOCUMENTS

| 8,191,368 B2 | 6/2012 | Garrett et al. |
| 8,764,384 B2 | 7/2014 | Dullack et al. |
| 8,967,956 B2 | 3/2015 | Arnold et al. |
| 2007/0089413 A1 | 4/2007 | Green et al. |
| 2010/0251709 A1 | 10/2010 | Wirbeleit et al. |
| 2011/0067680 A1 | 3/2011 | Williams et al. |
| 2012/0023936 A1 | 2/2012 | Kruiswyk et al. |
| 2012/0159950 A1 | 6/2012 | Wu |

(Continued)

FOREIGN PATENT DOCUMENTS

| DE | 3101131 A1 | 8/1982 |
| EP | 2261481 B1 | 7/2014 |

OTHER PUBLICATIONS

European Search Report related to Application No. EP 17171067 dated Jul. 21, 2017.

*Primary Examiner* — Ngoc T Nguyen

(57) ABSTRACT

A turbocharger housing for an engine includes a specifically designed mounting interface provided at a turbine outlet of a turbine housing. In particular, the mounting interface includes a mounting flange that is inclined with respect to a plane that is orthogonal to the longitudinal direction of the turbocharger. In particular, in case of an arrangement where the turbocharger is arranged such that the shaft of the same extends substantially horizontally, the mounting flange of the turbine outlet is rotated by a predetermined angle of, for example, 20 degrees about the vertical axis.

13 Claims, 4 Drawing Sheets

(56) References Cited

U.S. PATENT DOCUMENTS

2012/0269620 A1 10/2012 Boening et al.
2013/0014503 A1 1/2013 Romblom et al.
2015/0345375 A1 12/2015 Grabowska

TURBOCHARGER HOUSING

CROSS-REFERENCE TO RELATED APPLICATION

This application claims priority under 35 USC § 119 and the Paris Convention to European Application No. 17171067.6 filed on May 15, 2017.

TECHNICAL FIELD

The present disclosure generally relates to a turbocharger for an engine system, in particular, a compact turbocharger having a housing that is designed to facilitate installation of the turbocharger in tight spaces.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into the combustion chambers of the engine. The increased supply of air allows increased fuel combustion in the combustion chambers of the engine, resulting in increased power output from the engine.

A typical turbocharger includes a shaft, a turbine wheel attached to one end of the shaft, a compressor impeller connected to the other end of the shaft, and bearings to support the shaft. Generally, a turbine housing surrounds the turbine wheel, and a compressor housing surrounds the compressor impeller. In addition, the turbocharger includes a center housing that surrounds the shaft and the bearings and includes features that help to prevent leakage of the bearing lubrication oil into the turbine housing or the compressor housing. The turbine housing, the compressor housing, and the center housing are attached to each other via fasteners or other clamping mechanism.

Hot exhaust from the engine flows through the turbine housing and expands over the turbine wheel, rotating the turbine wheel and the shaft connected to the turbine wheel. The shaft in turn rotates the compressor impeller. The cool air from the ambience flows through the compressor housing, where the compressor impeller compresses the air and drives the compressed air into the combustion chambers of the engine.

For example, U.S. Pat. No. 8,967,956 B2 discloses a turbocharger with a variable-nozzle assembly.

The present disclosure is directed, at least in part, to improving or overcoming one or more aspects of prior systems.

SUMMARY OF THE DISCLOSURE

In one aspect, the present disclosure relates to a turbocharger for an engine system. The turbocharger comprises a compressor housing including a compressor inlet and a compressor outlet, a turbine housing including a turbine inlet, a turbine wheel and a turbine outlet, and a center housing connected between the compressor housing and the turbine housing. A shaft is supported in the center housing and extends in a longitudinal direction of the turbocharger. The turbine inlet includes a first mounting interface for connecting the turbocharger to an exhaust system of the engine system. The first mounting interface faces in a first direction perpendicular to the longitudinal direction. Further, the turbine outlet includes a second mounting interface for connecting the turbocharger to an exhaust aftertreatment system of the engine system. The second mounting interface faces in a second direction that extends at a first predetermined angle with respect to the plane defined by the longitudinal direction and the first direction.

In another aspect, the present disclosure relates to an engine system comprising an engine and a turbocharger according to the above aspect.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and together with the description, serve to explain the principles of the disclosure. In the drawings.

DETAILED DESCRIPTION

Figure 1:
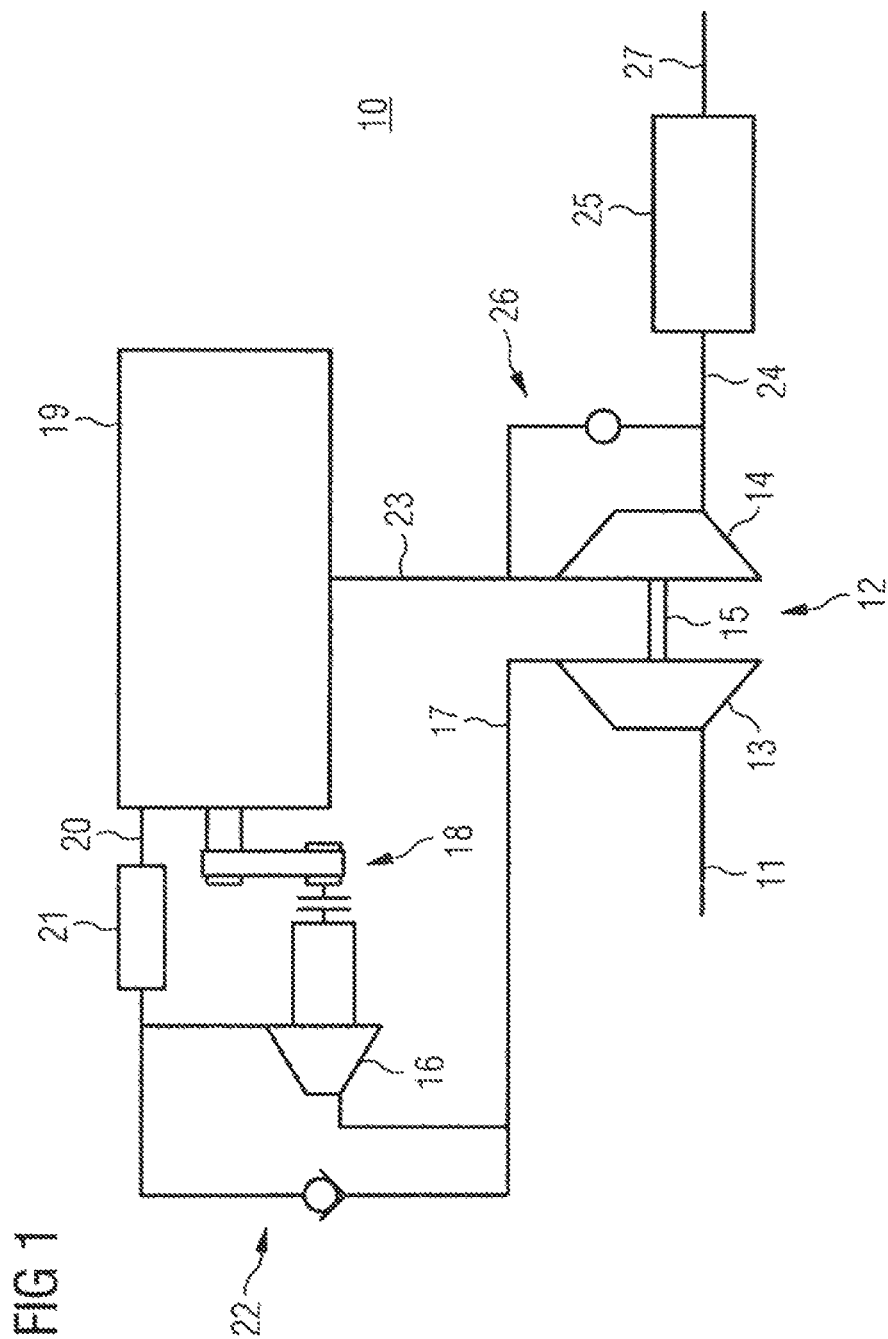
FIG. 1 shows a schematic overview of an exemplary engine system in accordance with the present disclosure.

The following is a detailed description of exemplary embodiments of the present disclosure. The exemplary embodiments described herein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based in part on the realization that, when a turbocharger is to be installed in a tight space in a compact engine system, it may be problematic to connect, for example, a turbine outlet to an engine-mounted aftertreatment system. Therefore, it may be necessary to provide a special design for the mounting interface at the turbine outlet in order to allow easy installation of the turbocharger, in particular, for compact engines.

The present disclosure is also based at least in part on the realization that, in order to avoid a reduction of a turbine efficiency, it may be necessary to optimize a gas flow angle from a turbine waste gate port to ensure that the exhaust gas flowing from the waste gate port is merged with the exhaust from the turbine wheel in a manner that creates a minimal disturbance to the exhaust gas flow. In accordance with the present disclosure, this is achieved by providing a waste gate port that has a gas flow angle that extends at a predetermined angle with respect to the longitudinal direction of the turbocharger, for example, substantially along the direction in which the mounting interface of the turbine outlet is facing.

The present disclosure is further based at least in part on the realization that, when installing an oil feed line having, for example, a captive banjo and O-ring interface to a center housing of the turbocharger, there may not be sufficient space for receiving, in particular, the O-ring of the connection. Therefore, in accordance with the present disclosure, it has been realized that it may be necessary to design the center housing of the turbocharger in such a manner that extra material/space is provided at the sealing area to accommodate the O-ring connection at the oil inlet of the center housing.

Further, the present disclosure is based at least in part on the realization that, when a drain pipe flange is to be installed at an oil outlet of the center housing of the turbocharger, it may sometimes be difficult to access the same with the tools for mounting the drain pipe flange, in particular, in a tight space associated with a compact engine. Therefore, in the present disclosure, the center housing is rotated with respect to the turbine inlet flange such that the turbine inlet flange does not interfere with the tools during mounting of the drain pipe flange.

In this respect, it has also been realized that, especially when a flange having a specific design is to be mounted to the center housing of the turbocharger, it may be necessary to install the flange at an angle with respect to a plane perpendicular to the longitudinal direction of the center housing. In other words, the flange has to be mounted diagonally on a corresponding mounting surface formed around the oil outlet of the center housing. This allows the specifically designed flange to fit in the housing and also assists the manufacturing assembly of the engine system.

FIG. 1 illustrates an exemplary embodiment of an engine system 10 suitable for implementing the teachings of the present disclosure. The engine system 10 comprises an engine 19 and an aftertreatment module 25. Additionally, as shown in FIG. 1, the engine system 10 comprises a turbocharger 12, a supercharger 16, and a cooler 21.

Particularly, the engine system 10 comprises a first conduit 11 for directing intake gas, such as atmospheric air, to the turbocharger 12. The turbocharger 12 comprises a turbocharger compressor 13. The turbocharger compressor 13 is connected to the first conduit 11 and arranged to be driven by a turbine 14 via a shaft 15. The engine system 10 further comprises the supercharger 16 for receiving intake gas from the turbocharger compressor 13 via a second conduit 17. A supercharger drive arrangement 18 may be provided for selectively driving the supercharger 16. The engine 19 is arranged to provide power to the supercharger 16 mechanically via the supercharger drive arrangement 18.

In the embodiment, the engine system 10 further comprises a third conduit 20 for directing the intake gas from the supercharger 16 to the cooler 21. The engine system 10 further comprises a supercharger bypass arrangement 22 for selectively allowing intake gas to bypass the supercharger 16. It will be appreciated that in other embodiments the supercharger 16, the supercharger drive arrangement 18 and the supercharger bypass arrangement 22 may be omitted, such that the second conduit 17 is connected to the cooler 21.

The engine 19 may be an internal combustion engine such as a compression-ignition or spark-ignition engine. Fuel, such as diesel, gasoline or natural gas, may be selectively provided to engine cylinders in the engine 19 to combust with the intake gas and drive the pistons, thereby rotating a crankshaft and providing an engine output torque and power.

The byproduct of the combustion process is exhaust gas, which is directed from the engine cylinders along a fifth conduit 23 of the engine system 10 via, for example, an exhaust manifold. The exhaust gas may comprise unwanted gaseous emissions or pollutants, such as nitrogen oxides (NOx), particulate matter (such as soot), sulphur oxides, carbon monoxide, unburnt hydrocarbons and/or other organic compounds. The fifth conduit 23 directs exhaust gas from the engine 19 to the turbine 14 of the turbocharger 12. The engine system 10 further comprises a sixth conduit 24 for directing exhaust gas from the turbine 14 to the aftertreatment module 25. A turbine bypass arrangement 26 including, for example, a waste gate assembly 60 (see FIG. 3) may be provided for selectively allowing exhaust gas to bypass the turbine 14.

The aftertreatment module 25 receives and treats the exhaust gas to remove pollutants prior to directing the exhaust gas to the atmosphere via a seventh conduit 27.

Figure 2:
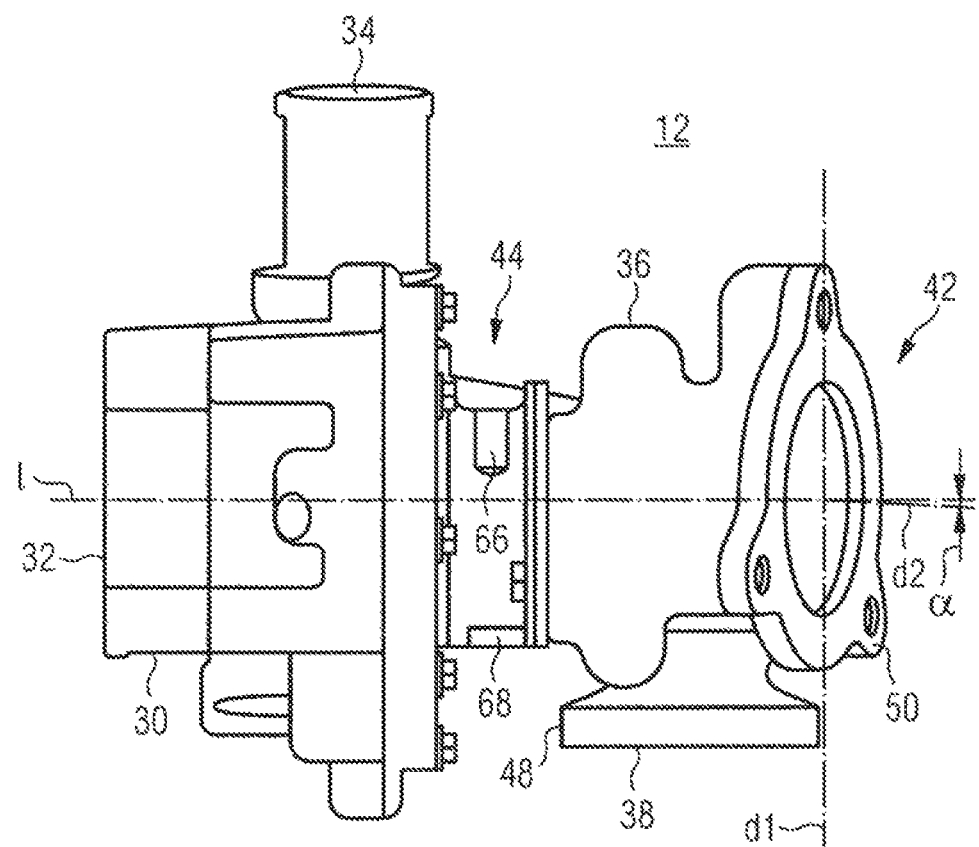
FIG. 2 is a partially cut perspective side view of an exemplary turbocharger in accordance with the present disclosure.

FIG. 2 shows, an exemplary configuration of the turbocharger 12 in accordance with the present disclosure. As shown in FIG. 2, the turbocharger 12 comprises a compressor housing 30 of the turbocharger compressor 13, a compressor inlet 32 connected to the first conduit 11, and a compressor outlet 34 connected to the second conduit 17. A compressor impeller (not shown) is arranged inside compressor housing 30.

Further, as shown in FIG. 2, the turbocharger 12 also includes a turbine housing 36 including, a turbine inlet 38 connected to an exhaust system of the engine, in particular, to the fifth conduit 23, a turbine wheel 40 arranged inside the turbine housing 36 (see FIG. 3), and a turbine outlet 42 connected to an exhaust aftertreatment system of the engine system 10 including, for example, the sixth conduit 24 and the aftertreatment module 25.

Additionally, the turbocharger 12 also includes a center housing 44 connected between the compressor housing 30 and the turbine housing 36. The center housing 44 supports the shaft 15, which extends in a longitudinal direction 1 of the turbocharger 12. Further, the center housing 44 includes an oil inlet 66 disposed at a position above the shaft 15 for supplying lubricant to the same, and an oil outlet 68 disposed below the shaft 15 for draining lubricant from the center housing 44.

The turbine inlet 38 includes a first mounting interface 48 for connecting the turbocharger 12 to the exhaust system of the engine system 10, in particular, to the fifth conduit 23. As shown in FIG. 2, the first mounting interface 48 is formed as a flange which faces in a first direction d1 that is, for example, perpendicular to the longitudinal direction 1. In some embodiments, the first direction d1 corresponds to the vertical direction, i.e., the turbocharger is installed in the engine system 10 such that in the installed state, the flange of the turbine inlet 38 is mounted to the exhaust system of engine system 10 in a substantially horizontal orientation, as shown in FIG. 2.

As also shown in FIG. 2, the turbine outlet 42 includes a second mounting interface 50 for connecting the turbocharger 12 to the exhaust aftertreatment system, in particular, to the sixth conduit 24. Here, there may be design restrictions with respect to engine system 10 that require that, for example, the sixth conduit 24 extends along a specific direction towards the aftertreatment module 25, or the sixth conduit 24 may be omitted and the turbine outlet 42 may have to be directly connected to the aftertreatment module 25. In order to facilitate mounting mounting of the turbine outlet 42 to the exhaust aftertreatment system of the engine system 10, a specific interface angle of the second mounting interface 50 has to be provided. In particular, as shown in FIG. 2, the second mounting interface 50 is configured such that it faces in a second direction d2 that is non-parallel to the longitudinal direction 1 of the turbocharger 12. In the exemplary embodiment, the second direction d2 extends at a first predetermined angle α with respect to the plane defined by the longitudinal direction 1 and the first direction d1. In other words, in case the turbocharger 12 is installed in the engine system 10 such that the turbine inlet 38 is arranged substantially horizontally, such that the first direction d1 coincides with the vertical direction, the second mounting interface 50 of the turbine outlet 42 can be viewed as being rotated by the first predetermined angle α about the vertical axis. In other words, the second direction d2 extends at the first predetermined angle α with respect to the drawing sheet plane. For the sake of illustration, the second direction d2 is indicated by a dashed line in FIG. 2, with the first predetermined angle α being illustrated accordingly. The first predetermined angle α may be between 5 degrees and 45 degrees, preferably between 10 degrees and 30 degrees, for example, about 20 degrees in the present embodiment. It will be appreciated that the value of the first predetermined angle α depends on the configuration of the engine system 10, in particular, the arrangement of the exhaust aftertreatment system with respect to the turbocharger 12.

Figure 3:
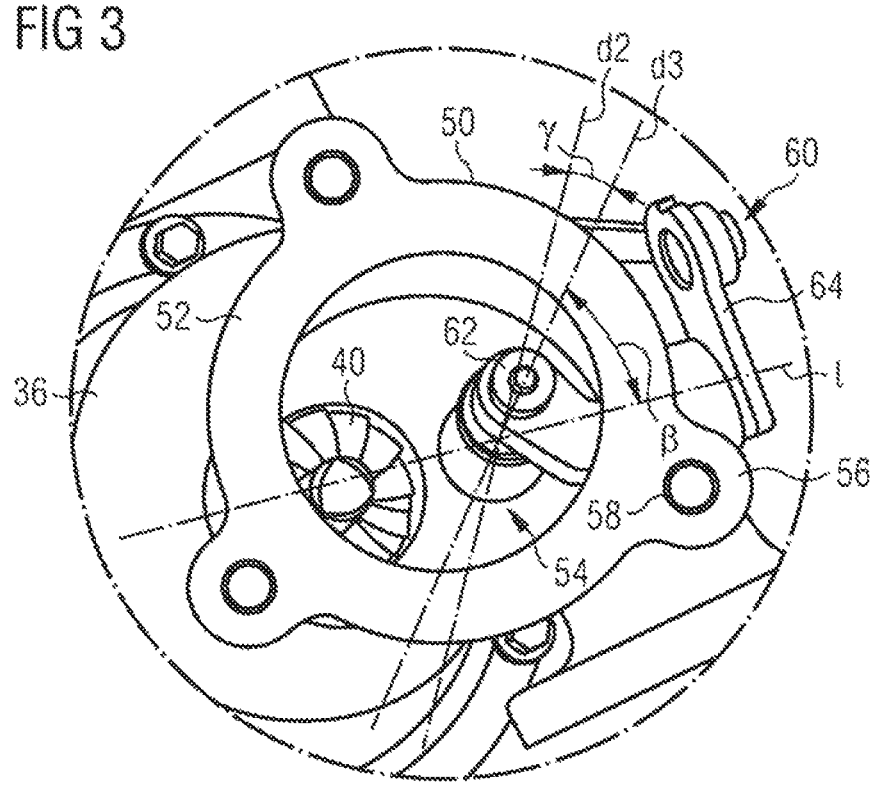
FIG. 3 is a perspective front view of an exemplary mounting interface of the turbocharger in FIG. 2.

FIG. 3 shows the second mounting interface 50 of the turbine outlet 42 in more detail in a front view. As shown in FIG. 3, the second mounting interface 50 includes a peripheral mounting flange 52 extending around an outlet opening 54 of the turbine outlet 42. As shown in FIG. 3, in the exemplary embodiment, a plurality of mounting portions 56 are provided on the mounting flange 52 to extend radially outward from the same. Each mounting portion 56 has a through hole 58 for mounting the mounting flange 52 to the exhaust aftertreatment system. In the exemplary embodiment shown in FIG. 3, three mounting portions 56, which are formed as projections from the mounting flange 52, are provided spaced apart from each other in the circumferential direction, for example, at angles of approximately 120 degrees. In other embodiments, the mounting portions 56 may be formed with an unequal spacing, for example, with angles of 120 degrees, 108 degrees and 132 degrees between the same, but not limited to these exemplary values.

FIG. 3 also shows the turbine wheel 40 installed in the turbine housing 36. The turbine wheel 40 is mounted on the shaft 15 that extends along the longitudinal direction 1, which is schematically illustrated in FIG. 3. Accordingly, exhaust gas is directed from turbine wheel 40 towards turbine outlet 42 substantially along the longitudinal direction 1.

As also shown in FIG. 3, the turbocharger 12 further comprises the waste gate assembly 60 that is configured to selectively allow exhaust gas entering the turbine inlet 38 to bypass the turbine wheel 40. The waste gate assembly 60 includes a waste gate port 62 arranged inside the turbine housing 36 and configured to supply the exhaust gas that has bypassed the turbine wheel 40 to the turbine outlet 42. Here, in order to optimize mixing of the exhaust entering from the turbine wheel 40 with the exhaust that is supplied via waste gate port 62, the supply angle of the waste gate port 62 may be a second predetermined angle β. In particular, the waste gate port 62 may be configured to supply the exhaust gas along a third direction d3 that extends at the second predetermined angle β with respect to the longitudinal direction 1.

In some embodiments, the third direction d3 may be substantially the same as the second direction d2. In other words, the second predetermined angle β may also be between 5 degrees and 35 degrees, preferably between 10 degrees and 30 degrees, in particular, for example, 19.8 degrees.

In other embodiments, however, the first and second predetermined angles α, β may not be the same, and an intermediate angle γ may be defined between the second direction d2 and the third direction d3. The intermediate angle γ may be, for example less than 90 degrees, preferably less than 45 degrees.

The supply of exhaust gas via the waste gate port 62 is regulated in a known manner using, for example, an actuating arm 64, such that a detailed description will be omitted. For example, the actuating arm 64 may be configured to actuate a flow control valve, for example, a poppet valve, configured to selectively open/close the waste gate port 62. When the flow control valve is opened, the exhaust gas exiting from the waste gate port 62 is diverted by a valve element of the flow control valve to promote mixing of the exhaust gas with the exhaust flow from the turbine wheel 40. Here, using the second predetermined angle β and an appropriate configuration of the flow control valve, the exhaust gas flow from the turbine outlet 42 can be optimized such that a uniform flow is created in, for example, the sixth conduit 24, such that a minimal disturbance occurs.

Figure 4:
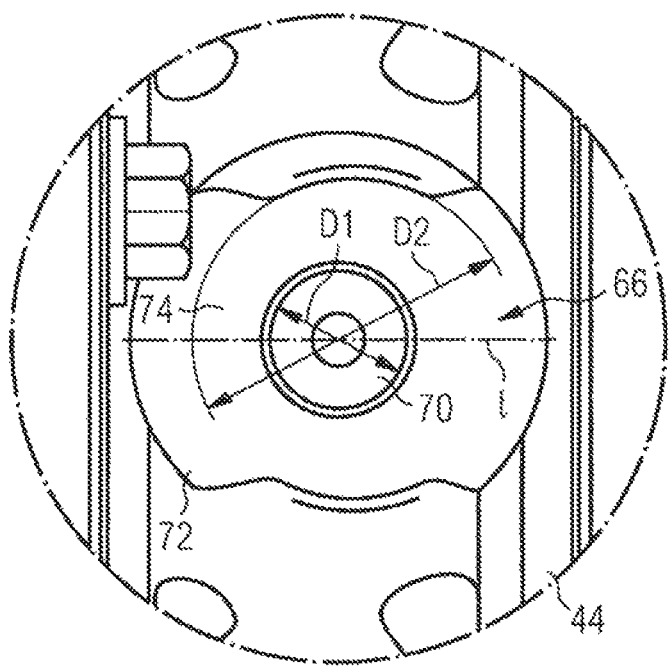
FIG. 4 is a plan view of a center housing of the turbocharger in FIG. 2.

Turning now to FIG. 4, a partial top view of the center housing 44 is shown. In particular, FIG. 4 shows a configuration of the oil inlet 66 formed in the center housing 44. As shown in FIG. 4, the oil inlet 66 includes an oil inlet port 70 that is configured to receive a supply of lubricant from an oil feed line (not shown). For example, the oil feed line may be connected to the oil inlet 66 by means of a captive banjo and O-ring interface.

In order to allow connection of the oil feed line, for example, by the banjo and O-ring interface, an extended sealing land 72 is provided circumferentially around the oil inlet port 70, which is configured as a hole having an inner diameter D1 of, for example, 10 mm. For example, the hole may be configured to receive a banjo bolt having a corresponding outer diameter. The extended sealing land 72 includes an annular sealing surface 74 for sealing engagement with a seal of the oil feed line, for example, a corresponding O-ring disposed around the banjo bolt. The plane sealing surface 74 may have an outer diameter D2 that allows for easy installation of the seal, for example, a diameter D2 that is between 21.9 and 25 mm, in particular, about 22 mm. In some embodiments, a ratio of the outer diameter D2 of the sealing surface 74 to the inner diameter D1 of the oil inlet port 70 may be between 2.19 and 2.5, for example, about 2.2.

In addition to the specific configuration of the oil inlet 66 and the second mounting interface 50 of the turbine outlet 42, in some embodiments, it may also be necessary to provide a specific configuration with respect to the oil outlet 68. This is shown in an exemplary manner in FIGS. 5 and 6.

Figure 5:
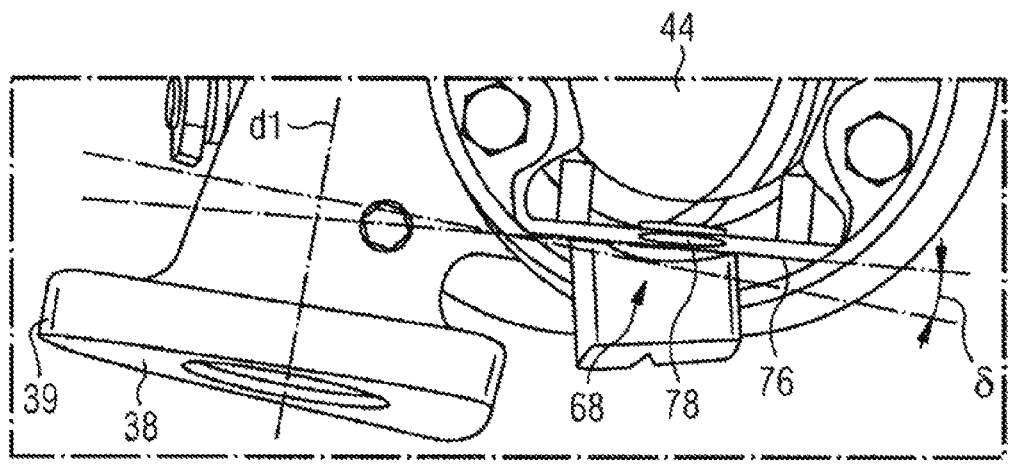
FIG. 5 is a partial perspective view showing an arrangement of a turbine outlet and a mounting surface formed adjacent to an oil outlet in accordance with the present disclosure.

As shown in FIG. 5, the oil outlet 68 is provided with a substantially plane mounting surface 76 around an oil outlet opening 78 of the same. The mounting surface 76 is configured to allow assembly of, for example, a drain pipe flange for connecting the oil outlet 68 to a drain pipe. However, in order to allow tool access during assembly of the drain pipe flange to the mounting surface 76, it has to be assured that the flange of the turbine inlet 38 does not interfere with the assembly.

Therefore, in the exemplary embodiment shown in FIG. 5, the center housing 44 is inclined or rotated with respect to the flange of the turbine inlet 38, in particular, the center housing 44 is rotated about the longitudinal direction 1 by a predetermined third angle δ. In other words, the substantially plane mounting surface 76 that is perpendicular to the substantially vertical axis of extension of the oil outlet opening 78 extends at the predetermined third angle δ with respect to a plane that is orthogonal to the predetermined first direction d1, which is the direction in which the turbine inlet 38, in particular, the mounting flange 39 of the same, is facing. The plane of the mounting surface 76 is shown by the solid line in FIG. 5, and the inclination is indicated by the angle δ between said solid line and a dashed line that is perpendicular to the first direction d1. As described above, in some embodiments, the first direction d1 corresponds to the vertical direction, such that the angle δ corresponds to an angle with respect to the horizontal. The predetermined third angle δ is, for example, between 3 degrees and 15 degrees, preferably between 5 degrees and 7 degrees, in particular, about 6 degrees in the exemplary embodiment.

Figure 6:
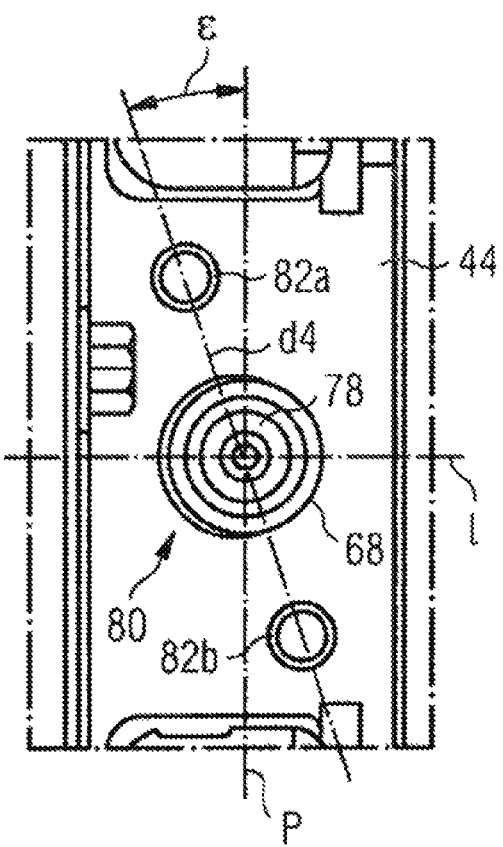
FIG. 6 is a bottom view of the center housing shown in FIG. 2.

Further, as shown in FIG. 6, in some embodiments, it may be necessary to mount a drain pipe flange to the oil outlet 68 that has a size that is relatively large, such that there may not be sufficient space for mounting the same to the center housing 44 in an orientation that is perpendicular to the longitudinal direction 1. To allow the drain pipe flange to fit in the center housing 44, it may therefore be necessary to mount the same in an inclined manner. Accordingly, a flange mounting portion 80 may be provided around the oil outlet 68 such that it includes a pair of mounting structures 82a, 82b that are arranged opposite to each other on both sides of the oil outlet opening 78 along a fourth direction d4 that extends at a fourth predetermined angle ε with respect to a center plane p of the center housing 44 that is perpendicular to the longitudinal direction 1. In other words, the mounting structures 82a, 82b are arranged such that the corresponding drain pipe flange is rotated by the angle ε about the direction of extension of the oil outlet opening 78, for example, the vertical direction. In this manner, the drain pipe flange can be easily installed on the center housing 44, for example, without projecting from the same. In some embodiments, the fourth predetermined angle ε is between 5 degrees and 30 degrees, preferably between 10 degrees and 20 degrees, in particular, about 18 degrees.

As previously mentioned, in some embodiments, the turbocharger 12 is configured such that it is mounted to the engine 19 by mounting the turbine inlet 38 to the exhaust system of the engine. To facilitate this, as shown in FIG. 5, the turbine inlet 38 includes the engine mounting flange 39 for mounting the turbocharger to the engine 19. In some embodiments, the turbocharger 12 is configured such that, when the turbocharger 12 is installed in the engine system 10, the engine mounting flange 39 is arranged substantially horizontally.

By providing One or more of the above-described specific configurations of the mounting interfaces and the oil inlet and/or the oil outlet, it becomes possible to conveniently install the turbocharger 12 in the engine system 10, even when the turbocharger 12 has to be installed in a tight space provided in the engine system 10, for example, in case of a compact engine system 10.

Although the preferred embodiments of this invention have been described herein, improvements and modifications may be incorporated without departing from the scope of the following claims.

The invention claimed is:

1. A turbocharger for an engine system, comprising:
   a compressor housing including a compressor inlet and a compressor outlet;
   a turbine housing including a turbine inlet, a turbine wheel and a turbine outlet;
   a center housing connected between the compressor housing and the turbine housing;
   a shaft supported in the center housing, the shaft extending in a longitudinal direction of the turbocharger; and
   a waste gate assembly configured to selectively allow exhaust gas entering the turbine inlet to bypass the turbine wheel, the waste gate assembly including a waste gate port configured to supply the exhaust gas that has bypassed the turbine wheel to the turbine outlet,
   wherein the turbine inlet includes a first mounting interface for connecting the turbocharger to an exhaust system of the engine system, the first mounting interface facing in a first direction perpendicular to the longitudinal direction,
   wherein the turbine outlet includes a second mounting interface for connecting the turbocharger to an exhaust aftertreatment system of the engine system, the second mounting interface facing in a second direction that extends at a first predetermined angle with respect to the plane defined by the longitudinal direction and the first direction,
   wherein the waste gate port is configured to supply the exhaust gas along a third direction that extends at a second predetermined angle with respect to the longitudinal direction, and
   wherein an intermediate angle between the second direction and the third direction is less than 45°.

2. The turbocharger of claim 1, wherein the second mounting interface includes a peripheral mounting flange extending around an outlet opening of the turbine outlet.

3. The turbocharger of claim 2, wherein the second mounting interface further includes a plurality of mounting portions provided on the mounting flange to extend radially outward from the same, each mounting portion having a through hole for mounting the mounting flange to the exhaust aftertreatment system.

4. The turbocharger of claim 1, wherein the third direction is substantially the same as the second direction, the first and second predetermined angles being between 5° and 45°.

5. The turbocharger of claim 1, wherein, when the turbocharger is installed in the engine system, the longitudinal direction and the predetermined second direction lie in a substantially horizontal plane.

6. The turbocharger of claim 1, wherein the center housing includes an oil inlet disposed above the shaft for supplying lubricant to the same, the oil inlet including an oil inlet port configured to receive a supply of the lubricant,
   wherein an extended sealing land is provided circumferentially around the oil inlet port, the extended sealing land providing an annular sealing surface for sealing engagement with a seal of an oil feed line to be connected to the oil inlet.

7. The turbocharger of claim 6, wherein a ratio of an outer diameter of the sealing surface to an inner diameter of the oil inlet port is between 2.19 and 2.5.

8. The turbocharger of claim 1, wherein the center housing includes an oil outlet disposed below the shaft for draining lubricant from the same, wherein a substantially plane mounting surface is provided around an oil outlet opening of the oil outlet,
   wherein the substantially plane mounting surface extends at a predetermined third angle with respect to the plane orthogonal to the predetermined first direction.

9. The turbocharger of claim 8, wherein the predetermined third angle is between 3° and 15°.

10. The turbocharger of claim 8, wherein the center housing includes a flange mounting portion configured for mounting a drain flange to the same, the flange mounting portion including a pair of mounting structures arranged opposite to each other on both sides of the oil outlet opening along a fourth direction,
   wherein the fourth direction extends at a fourth predetermined angle with respect to a center plane of the center housing that is perpendicular to the longitudinal direction.

11. The turbocharger of claim 10, wherein the fourth predetermined angle is between 5° and 30°.

12. The turbocharger of claim 1, wherein the turbine inlet includes an engine mounting flange for mounting the turbocharger to, an engine of engine system,
   wherein the engine mounting flange is arranged substantially horizontally when the turbocharger is installed in the engine system.

13. An engine system comprising:
   an engine; and
   the turbocharger of claim 1.

* * * * *